United States Patent
Tsuchiya et al.

(10) Patent No.: US 12,062,792 B2
(45) Date of Patent: Aug. 13, 2024

(54) NEGATIVE ELECTRODE MATERIAL FOR LITHIUM-ION SECONDARY CELL, METHOD FOR MANUFACTURING NEGATIVE ELECTRODE MATERIAL FOR LITHIUM-ION SECONDARY CELL, NEGATIVE ELECTRODE MATERIAL SLURRY FOR LITHIUM-ION SECONDARY CELL, NEGATIVE ELECTRODE FOR LITHIUM-ION SECONDARY CELL, AND LITHIUM-ION SECONDARY CELL

(71) Applicant: SHOWA DENKO MATERIALS CO., LTD., Tokyo (JP)

(72) Inventors: Hideyuki Tsuchiya, Tokyo (JP); Tsutomu Satoh, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 506 days.

(21) Appl. No.: 17/295,888

(22) PCT Filed: Nov. 22, 2018

(86) PCT No.: PCT/JP2018/043296
§ 371 (c)(1),
(2) Date: May 21, 2021

(87) PCT Pub. No.: WO2020/105196
PCT Pub. Date: May 28, 2020

(65) Prior Publication Data
US 2022/0131147 A1    Apr. 28, 2022

(51) Int. Cl.
| | | |
|---|---|---|
| H01M 4/58 | (2010.01) | |
| C01B 32/205 | (2017.01) | |
| H01M 4/133 | (2010.01) | |
| H01M 4/587 | (2010.01) | |
| H01M 10/0525 | (2010.01) | |
| H01M 4/02 | (2006.01) | |

(52) U.S. Cl.
CPC .......... *H01M 4/587* (2013.01); *C01B 32/205* (2017.08); *H01M 4/133* (2013.01); *H01M 10/0525* (2013.01); *C01P 2004/32* (2013.01); *C01P 2006/12* (2013.01); *C01P 2006/40* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 6,156,457 A | 12/2000 | Takami et al. | |
| 2005/0064096 A1* | 3/2005 | Kurihara | H01M 4/0404 252/182.1 |

(Continued)

FOREIGN PATENT DOCUMENTS

| | | |
|---|---|---|
| CN | 102362380 A | 2/2012 |
| JP | H05-144440 A | 6/1993 |

(Continued)

*Primary Examiner* — Wyatt P McConnell
(74) *Attorney, Agent, or Firm* — SOLARIS Intellectual Property Group, PLLC

(57) ABSTRACT

A negative electrode material for a lithium-ion secondary cell, comprising carbon particles having an oxygen content of 0.15% by mass or less.

11 Claims, 1 Drawing Sheet

(56) References Cited

U.S. PATENT DOCUMENTS

| | | | | |
|---|---|---|---|---|
| 2012/0064403 A1* | 3/2012 | Kameda | ................ | H01M 4/366 |
| | | | | 429/211 |
| 2013/0071730 A1* | 3/2013 | Tokuda | ............. | H01M 10/0567 |
| | | | | 429/188 |
| 2018/0006300 A1 | 1/2018 | Jeong et al. | | |

FOREIGN PATENT DOCUMENTS

| | | |
|---|---|---|
| JP | H08-78012 A | 3/1996 |
| JP | H08-148185 A | 6/1996 |
| JP | H09-320592 A | 12/1997 |
| JP | H10-312807 A | 11/1998 |
| JP | H11-354122 A | 12/1999 |
| JP | 2000-077100 A | 3/2000 |
| JP | 2000-299106 A | 10/2000 |
| JP | 2000-299132 A | 10/2000 |
| JP | 2004-111110 A | 4/2004 |
| JP | 2004-196609 A | 7/2004 |
| JP | 2010-251314 A | 11/2010 |
| JP | 2014-146607 A | 8/2014 |
| JP | 2017-045537 A1 | 3/2017 |
| JP | 2018-133340 A | 8/2018 |
| KR | 10-2012-0003442 A | 1/2012 |
| WO | 2017-221895 A1 | 12/2017 |

\* cited by examiner

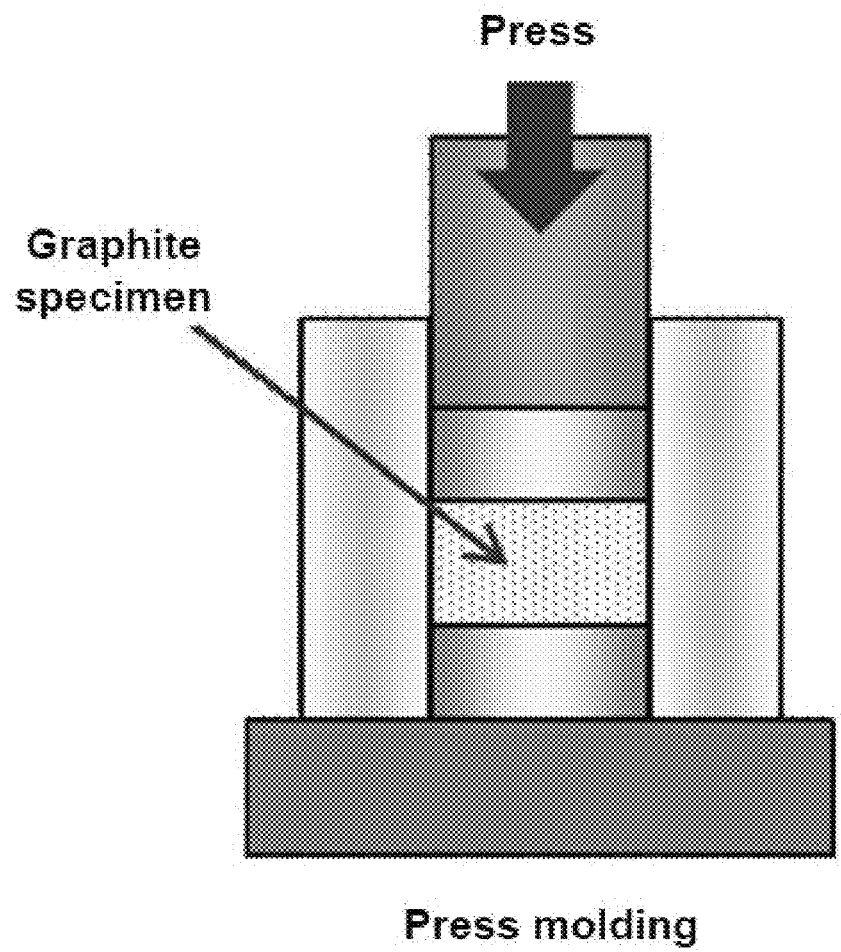

NEGATIVE ELECTRODE MATERIAL FOR LITHIUM-ION SECONDARY CELL, METHOD FOR MANUFACTURING NEGATIVE ELECTRODE MATERIAL FOR LITHIUM-ION SECONDARY CELL, NEGATIVE ELECTRODE MATERIAL SLURRY FOR LITHIUM-ION SECONDARY CELL, NEGATIVE ELECTRODE FOR LITHIUM-ION SECONDARY CELL, AND LITHIUM-ION SECONDARY CELL

TECHNICAL FIELD

The disclosure relates to a negative electrode material for a lithium-ion secondary cell, a method for manufacturing a negative electrode material for a lithium-ion secondary cell, a negative electrode material slurry for a lithium-ion secondary cell, a negative electrode for a lithium-ion secondary cell, and a lithium-ion secondary cell.

BACKGROUND ART

Lithium-ion secondary cells, having a high degree of energy density as compared with other secondary cells such as nickel-cadmium cells, nickel-hydrogen cells and lead storage cells, are widely used as a power source for mobile electronic devices such as laptop computers and cell phones. Recently, lithium-ion secondary cells increasingly have come to be applied to electronic vehicles, power sources for electricity storage systems, and the like, and not only to relatively small electronic devices.

As a negative electrode material for lithium-ion secondary cells, Patent Documents 1 and 2, for example, disclose graphite particles being coated with an amorphous carbon in order to improve the charge-and-discharge rate, suppress a side reaction with an electrolyte, and the like, while taking advantage of the high capacity that is a feature of graphite.

PRIOR ART DOCUMENTS

Patent Documents

[Patent Document 1] Japanese Patent Application Laid-Open No. 2004-196609
[Patent Document 2] Japanese Patent Application Laid-Open No. 11-354122

SUMMARY OF THE INVENTION

Problem to be Solved by the Invention

When graphite particles that are coated with an amorphous carbon, which is harder than graphite, are used as a negative electrode material, cracks may be formed in the amorphous carbon coating during a process of manufacturing a negative electrode in which the negative electrode material is subjected to pressing at high pressure, and the cracks may become the source of a reaction with an electrolyte or expansion of the negative electrode. Therefore, development of a negative electrode material that can improve the properties of a cell without an amorphous carbon coating is desired.

In view of the foregoing, an embodiment of the invention aims to provide a negative electrode material for a lithium-ion secondary cell, a method for manufacturing a negative electrode material for a lithium-ion secondary cell, a negative electrode material slurry for a lithium-ion secondary cell, a negative electrode for a lithium-ion secondary cell, and a lithium-ion secondary cell, which can improve the properties of a cell without an amorphous carbon coating.

Means for Solving the Problem

The means for solving the problem includes the following embodiments.

<1> A negative electrode material for a lithium-ion secondary cell, comprising carbon particles having an oxygen content of 0.15% by mass or less.

<2> The negative electrode material for a lithium-ion secondary cell according to <1>, wherein the carbon particles have an R value of 0.45 or less.

<3> The negative electrode material for a lithium-ion secondary cell according to <1> or <2>, wherein the carbon particles have a rhombohedral crystal amount of greater than 0.20.

<4> The negative electrode material for a lithium-ion secondary cell according to any one of <1> to <3>, wherein the carbon particles have a circularity of greater than 0.8.

<5> The negative electrode material for a lithium-ion secondary cell according to any one of <1> to <4>, wherein the carbon particles do not have a DTA exothermic peak detected in a range of from 500° C. to 650° C. in differential thermal analysis.

<6> The negative electrode material for a lithium-ion secondary cell according to any one of <1> to <5>, wherein the carbon particles have a specific surface area measured by nitrogen gas adsorption of 4.0 $m^2/g$ or more.

<7> A negative electrode material slurry for a lithium-ion secondary cell, comprising the negative electrode material for a lithium-ion secondary cell according to any one of <1> to <6>, an organic binder, and a solvent.

<8> A negative electrode for a lithium-ion secondary cell, comprising a current collector and a negative electrode layer, the negative electrode layer comprising the negative electrode material for a lithium-ion secondary cell according to any one of <1> to <6>.

<9> A lithium-ion secondary cell, comprising a positive electrode, an electrolyte, and the negative electrode for a lithium-ion secondary cell according to <8>.

<10> A method for manufacturing a negative electrode material for a lithium-ion secondary cell, the method comprising:
a process of heating carbon particles until a temperature of the carbon particles is from 400° C. to 1300° C.; and
a process of cooling the carbon particles after the heating until a temperature of the carbon particles is less than 400° C.,
the heating and the cooling being performed in a non-oxidizing atmosphere, respectively.

<11> The method for manufacturing a negative electrode material for a lithium-ion secondary cell according to <10>, which is a method for manufacturing the negative electrode material for a lithium-ion secondary cell according to any one of <1> to <6>.

Effect of the Invention

According to an embodiment of the invention, a negative electrode material for a lithium-ion secondary cell, a method for manufacturing a negative electrode material for a lithium-ion secondary cell, a negative electrode material slurry for a lithium-ion secondary cell, a negative electrode for a lithium-ion secondary cell, and a lithium-ion secondary cell, which can improve the properties of a cell without an amorphous carbon coating, are provided.

BRIEF EXPLANATION OF THE DRAWING

FIG. 1 is a schematic sectional view of an apparatus used for the evaluation of press properties.

EMBODIMENTS FOR IMPLEMENTING THE INVENTION

Embodiments for implementing the invention will now be described in detail. However, the invention is in no way limited to the following embodiments. In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "to" represents a range in which numerical values described before and after the "to" are included in the range as a minimum value and a maximum value, respectively.

In a numerical range described in stages, in the present disclosure, an upper limit value or a lower limit value described in one numerical range may be replaced with an upper limit value or a lower limit value in another numerical range described in stages. Further, in a numerical range described in the present disclosure, the upper limit value or the lower limit value in the numerical range may be replaced with a value shown in the Examples.

In the present disclosure, each component may include plural kinds of substances corresponding to the component. In a case in which plural kinds of substances corresponding to each component are present in a composition, the content ratio or content of each component refers to the total content ratio or content of the plural kinds of substances present in the composition, unless otherwise specified.

In the present disclosure, particles corresponding to each component may include plural kinds of particles. In a case in which plural kinds of particles corresponding to each component are present in a composition, the particle size of each component refers to the value of the particle size of a mixture of the plural kinds of particles present in the composition, unless otherwise specified.

In the present disclosure, the term "layer" or "film" includes a state in which, when a region at which a layer or a film is disposed is observed, the layer or the film is formed at only a portion of the region, in addition to a state in which the layer or the film is formed at the total area of the region.
<Negative Electrode Material for Lithium-Ion Secondary Cell>

The negative electrode material for lithium-ion secondary cell according to the present disclosure (hereinafter, also referred to as a negative electrode material) includes carbon particles having an oxygen content of 0.15% by mass or less.

The negative electrode material as specified above maintains favorable properties (especially storage properties) of a lithium-ion secondary cell, without an amorphous carbon coating on carbon particles. Although the reason for this is not exactly clear, it is thought to be as follows.

When the carbon particles are graphite particles, there are oxygen-containing functional groups, such as —OH (hydroxy group), >O=O (carbonyl group) and —COOH (carboxy group) at an edge portion of the graphite, and the oxygen-containing functional groups are considered to react with an electrolyte solution. Therefore, it is thought that favorable storage properties of a cell may be maintained by suppressing a reaction with an electrolyte solution, as a result of reducing the amount of oxygen-containing functional groups at an edge portion of the graphite to be within a certain range.

Further, a lithium-ion secondary cell using carbon particles having an oxygen content of 0.15% by mass or less exhibits an improved charge/discharge efficiency, as compared with a cell using carbon particles having an oxygen content of greater than 0.15% by mass. This is thought to be that the intercalation or desorption of lithium ions becomes easier by reducing the amount of oxygen-containing functional groups, which function as a barrier for the intercalation or desorption of lithium ions at the edge planes of graphite.

In the present disclosure, the oxygen content of the carbon particles is a value measured by an infrared absorption method. The measurement is conducted by a method as described in the Examples.

The oxygen content of the carbon particles may be regulated to be 0.15% by mass by, for example, heating the carbon particles at a temperature at which oxygen-containing functional group decompose. The oxygen content of the carbon particles is preferably 0.12% by mass or less, more preferably 0.10% by mass or less, more preferably 0.07% by mass or less, further preferably 0.04% by mass or less.

The lower limit of the oxygen content of the carbon particles is not particularly limited. From the viewpoint of a balance between the high-temperature storage properties and the input/output properties, the oxygen content of the carbon particles is preferably 0.005% by mass or more, more preferably 0.007% by mass or more, more preferably 0.01% by mass or more, more preferably 0.015% by mass or more, further preferably 0.02% by mass or more.

The carbon particles are preferably graphite particles, such as natural graphite particles and artificial graphite particles. Among the graphite particles, flake-shaped natural graphite particles are preferred in view of a large crystallite size and a high degree of capacity. Natural graphite tends to include oxygen-containing functional groups during the steps of production from ores and processing the same. Therefore, limiting the oxygen content of natural graphite particles to be not greater than 0.15% by mass is advantageous in view of suppressing the reaction with an electrolyte solution and improving the charge/discharge efficiency.

Example of the carbon particles include those in the form of scales, flakes, thin-plates or lumps, and spherical particles such as spherical graphite, which is obtained by spheronization of flat graphite particles. Among these, spherical particles are preferred. Since spherical particles are less prone to being unidirectionally oriented through a process of pressing the same to prepare an electrode, as compared with flat graphite particles, spherical particles are suitable for achieving rapid charge and discharge when the density of the electrode is increased. Meanwhile, spherical particles tend to create edge planes during a process of spheronization and include oxygen-containing functional groups. Therefore, limiting the oxygen content of spherical particles to be not greater than 0.15% by mass is advantageous for suppressing the reaction with an electrolyte solution and improving the charge/discharge efficiency. In the present disclosure, a particle having a circularity of 0.8 or more is referred to as a spherical particle.

In the present disclosure, the circularity of the carbon particles is measured with a wet flow-type particle size/particle shape analyzer. FPIA-3000 (Malvern Instruments) may be used as an analyzer. Prior to the measurement, the carbon particle may be subjected to a pretreatment. The pretreatment is performed by shaking a test tube (12 mm×120 mm, Maruemu Corporation) containing pure water with 0.06 g of carbon particles and 0.2% by mass of a surfactant (trade name: Liponol, Lion Corporation) with a test tube mixer (Pasolina NS-80, As One Corporation) for 20 seconds, and subsequently shaking with ultrasonic waves for one minute. The shaking with ultrasonic waves may be conducted with an ultrasonic cleaner, US102 (SND Co., Ltd., high-frequency output: 100 W, oscillation frequency: 38 kHz).

The particles size of the carbon particles is not particularly limited. For example, the volume-average particles size of the carbon particles is preferably from 1 µm to 50 µm, more preferably from 2 µm to 45 µm, more preferably from 3 µm to 35 µm, more preferably from 5 µm to 25 µm, further preferably from 7 µm to 20 µm.

The volume-average particles size of the carbon particles is measured by a laser diffraction particles size distribution analyzer, and is a particle size at an accumulation of 50% in a volume-based particle size distribution from the smaller side (D50).

(R Value)

The carbon particles preferably have an R value of 0.45 or less. The R value is an index for a degree of crystallinity at a surface of the carbon particles. The greater the R value is, the higher the degree of crystallinity is. The R value tends to increase when the surface of the carbon particles is damaged through the processing of the same such as spheronization. The carbon particles preferably have an R value of 0.42 or less, more preferably 0.40 or less, more preferably 0.32 or less, further preferably 0.30 or less.

The lower limit of the R value is not particularly limited. From the viewpoint of a balance of the cell properties, the R value is preferably 0.05 or more, more preferably 0.10 or more, more preferably 0.15 or more, more preferably 0.20 or more, further preferably 0.22 or more. When a high degree of charging properties are desired, the R value is preferably 0.15 or more.

In the present disclosure, the R value of the carbon particles is a ratio of intensity IB to intensity IA (IB/IA) obtained by Raman measurement, where IA is an intensity of a maximum peak at approximately 1580 $cm^{-1}$ and IB is an intensity of a maximum peak at approximately 1360 $cm^{-1}$.

The Raman measurement is performed by a Raman spectrometer such as a laser Raman spectrometer (NRS-1000, JASCO Corporation). The measurement is carried out by irradiating a specimen with laser light under the following conditions.

Wavelength of laser light: 532 nm
Wavelength resolution: 2.56 $cm^{-1}$
Measurement range: 1180 $cm^{-1}$ to 1730 $cm^{-1}$
Peak research: background removal In the measurement, a negative electrode for a lithium secondary cell or a plate-shaped specimen, which is obtained by applying a negative electrode material for a lithium-ion secondary cell onto a current collector and pressing the same to be flat, is used as the specimen.

(Rhombohedral Crystal Amount)

When the carbon particles include a graphitic substance, the rhombohedral crystal amount of the carbon particles is preferably 0.20 or more, more preferably 0.21 or more, more preferably 0.22 or more, more preferably 0.23 or more, further preferably 0.26 or more. When the rhombohedral crystal amount of the carbon particles is within the above ranges, the carbon particles tend to achieve favorable rapid charge/discharge properties, high-temperature storage properties and the like.

In general, as the rhombohedral crystal amount of graphite particles is increased (for example, over 0.33), pulverization of the graphite particles tends to proceed ahead of spheronization thereof. As a result, the oxygen content is rapidly increased and the high-temperature storage properties are rapidly decreased.

The present inventors have found that the carbon particles having an oxygen content of 0.15% by mass can improve the input/output properties while suppressing the decrease of the high-temperature storage properties.

The upper limit of the rhombohedral crystal amount of the carbon particles is not particularly limited. For example, the rhombohedral crystal amount of the carbon particles may be less than 0.50, or may be 0.45 or less, or may be 0.40 or less, or may be 0.35 or less, or may be 0.30 or less.

The rhombohedral crystal amount of the carbon particles is calculated from a peak intensity at (101) plane of a rhombohedral structure (P1) and a peak intensity at (101) plane of a hexagonal structure (P2) by the following formula.

Rhombohedral crystal amount=$P1/(P1+P2)$

P1: peak intensity at (101) plane of rhombohedral structure (diffraction angle 2θ is approx.) 43°
P2: peak intensity at (101) plane of rhombohedral structure (diffraction angle 2θ is approx.) 44°

The peak intensities can be measured by the following method. The measurement of diffraction peaks is performed by charging a specimen powder into a concave portion of a quartz specimen holder and setting the same at a measurement stage of a wide-angle X-ray diffraction analyzer (Rigaku Corporation), under the following conditions. After the measurement, Kα2 peak removal and background removal are performed, and a peak is separated with a profile function (Pseudo-Voigt).

Radiation source: CuKα (wavelength=0.15418 nm)
Divergence slit DS: 1°
Receiving slit RS: 0.3 mm
Scattering slit SS: 1°

The carbon particles may not be coated with an amorphous carbon. As mentioned above, when the oxygen content of the carbon particles is 0.15% by mass or less, reaction of the carbon particles with an electrolyte solution can be suppressed and favorable storage properties of a cell tend to be maintained, without an amorphous carbon coating.

Existence or non-existence of an amorphous carbon coating or a degree of the coating can be determined by differential thermal analysis (DTA), for example. When the carbon particles are coated with an amorphous carbon, a DTA exothermic peak tends to appear within a range of from 500° C. to 650° C.

When the carbon particles are coated with an amorphous carbon, the amount of the coating is preferably small such that a DTA exothermic peak does not exist within a range of from 500° C. to 650° C. For example, the amount of the amorphous carbon may be less than 1% by mass of the total carbon particles (total of core particles and amorphous carbon).

In the present disclosure, the differential thermal analysis (DTA) is measured with a simultaneous thermogravimetric analyzer (for example, EXTAR TG/DTA 6200, Seiko Instruments Inc.) Specifically, the existence or non-existence of a DTA exothermic peak is determined using α-alumina as a reference, under a dry airflow at 300 mL/min and a temperature increase rate of 2.5° C./min. When a negative electrode material includes a conductive aid in addition to the carbon particles, the negative electrode material is preferably subjected to centrifugal separation to extract a precipitate prior to the DTA measurement, since an exothermic peak derived from a conductive aid may be detected.

(Oil Absorption Amount)

The carbon particles preferably have an oil absorption amount of 25 mL/100 g or more, more preferably 30 mL/100 g or more, more preferably 35 mL/100 g or more, more preferably 40 mL/100 g or more, further preferably 45 mL/100 g or more.

The oil absorption amount of the carbon particles is an index for a proportion of a space inside the carbon particles or among the carbon particles. Since flat-shaped particles are folded or granulated during a process of spheronization to form densified spherical particles, the oil absorption amount tends to decrease. As mentioned previously, spheronized particles (i.e., particles having a small oil absorption amount) are preferable in view of suppressing the unidirectional orientation thereof upon pressing of an electrode. Meanwhile, from the viewpoint of securing a sufficient amount of an electrolyte solution for lithium ions to migrate and suppressing a decrease in the charge/discharge properties, the oil absorption amount is preferably not too small. For example, when the oil absorption amount of the carbon particles is 25 mL/100 g or more, a sufficient amount of an electrolyte solution for lithium ions to migrate at high speed can be secured and favorable properties of a cell tend to be maintained, even if the density of the electrode is high (for example, 1.7 $g/cm^3$ or more). When a high degree of capacity is not required or when the charge/discharge properties are regarded as important, the oil absorption amount is not limited to the above ranges since the electrode does not need to be highly densified.

The oil absorption amount of the carbon particles is more preferably 100 mL/100 g or less, more preferably 90 mL/100 g or less, more preferably 80 mL/100 g or less, more preferably 70 mL/100 g or less, further preferably 60 mL/100 g or less, for example. When the oil absorption amount of the carbon particles is 100 mL/100 g or less, the amount of water to adjust the viscosity of a slurry can be reduced and the consumption of energy for drying the electrode can be saved.

In the present disclosure, the oil absorption amount of the carbon particles can be measured by a method according to JIS K6217-4:2008 (Carbon black for rubber—basic properties—Section 4: measurement of oil absorption amount), using linseed oil (Kanto Chemical Co., Inc., for example) instead of dibutyl phthalate (DBP). Specifically, linseed oil is dropped onto a specimen powder with a constant-rate buret, and a change in the viscosity properties is measured from a torque detector. The amount of linseed oil per mass of the specimen powder, corresponding to 70% of a maximum value of generated torques, is determined as the oil absorption amount (ml/100 g). The measurement can be performed with, for example, an absorption measurement device from Asahi Souken Corporation.

(Tap Density)

The tap density of the carbon particles may be 0.70 $g/cm^3$ or more, or may be 0.75 $g/cm^3$ or more, or may be 0.80 $g/cm^3$ or more, or may be 0.85 $g/cm^3$ or more, or may be 0.90 $g/cm^3$ or more. When the tap density of the carbon particles is 0.70 $g/cm^3$ or more, a sufficient amount of a binder, which is used to form a plate-shaped electrode, adheres to a surface of the carbon particles, and problems such as separation of the electrode from a current collector tend to be avoided.

The tap density of the carbon particles may be 1.30 $g/cm^3$ or less, or may be 1.25 $g/cm^3$ or less, or may be 1.20 $g/cm^3$ or less, or may be 1.15 $g/cm^3$ or less, or may be 1.10 $g/cm^3$ or less. When the tap density of the carbon particles is 1.30 $g/cm^3$ or less, the amount of spaces among the carbon particles is increased, and the flexibility during a process of pressing tends to be improved.

In the present disclosure, the tap density of the carbon particles is measured using a tap density measurement device (KRS-406, Kuramochi Kagaku Kikai Seisakusho). In the measurement, 100 mL of carbon particles are placed in a measuring cylinder (Takahashi Rika Ryoki Kogyo K.K., diameter: 31 mm), and the measuring cylinder is dropped from a position at which the base of the measuring cylinder is 6 cm in height for a predetermined number of times (250 times). The density of the carbon particles after the dropping the measurement cylinder for 250 times is determined as the tap density.

(Specific Surface Area)

The specific surface area of the carbon particles is an index for an area of an interface between the carbon particles and the electrolyte solution. When the carbon particles have a small specific surface area, an area of an interface between the carbon particles and the electrolyte solution is not too large. As a result, the reaction site for a degradation reaction of the electrolyte solution is kept from increasing, whereby the amount of gas generation is suppressed. Further, the initial charge/discharge efficiency tends to be favorable. When the carbon particles have a large specific surface area, the current density per area is kept from rapidly increasing, and the load on a cell is reduced. As a result, the charge/discharge efficiency, charge acceptability, rapid charge/discharge properties and the like tend to be improved.

In the present disclosure, since the content of oxygen, which causes generation of a gas, is 1.5% by mass or less, the amount of a gas generated can be suppressed without reducing a specific surface area of the carbon particles.

The specific surface area of the carbon particles is not particularly limited. For example, the specific surface area of the carbon particles is preferably 0.5 $m^2/g$ or more, more preferably 1.0 $m^2/g$ or more, more preferably 2.0 $m^2/g$ or more, more preferably 3.0 $m^2/g$ or more, further preferably 4.0 $m^2/g$ or more.

The specific surface area of the carbon particles is preferably 20.0 $m^2/g$ or less, more preferably 15.0 $m^2/g$ or less, more preferably 12.0 $m^2/g$ or less, more preferably 10.0 $m^2/g$ or less, further preferably 8.0 $m^2/g$ or less.

The specific surface area of the carbon particles can be measured by a BET method (nitrogen gas adsorption method). Specifically, the carbon particles are charged in a measurement cell and subjected to a thermal pretreatment at 200° C. for at least 120 minutes while performing vacuum deaeration, thereby preparing a specimen. Thereafter, a nitrogen gas is adsorbed to the specimen using a gas adsorption device (ASAP2010, Shimadzu Corporation). The specimen is subjected to the BET analysis by a 5-point method, and a specific surface area is calculated.

The specific surface area of the carbon particles can be adjusted by an average particle size thereof. For example, the specific surface area of the carbon particles tends to increase as the average particle size is decreased, and the specific surface area of the carbon particles tends to decrease as the average particle size is decreased.

The negative electrode material may include, as the carbon particles having an oxygen content of 0.15% by mass or less, plural kinds of carbon particles having different shapes, particle sizes or the like.

The negative electrode material may include a negative electrode material other than the carbon particles having an oxygen content of 0.15% by mass or less. For example, the negative electrode material may include a material including an element that can adsorb and desorb the lithium ions, such as Si, Sn, Ge and In.

When the negative electrode material includes the carbon particles having an oxygen content of 0.15% by mass or less and a negative electrode material other than the carbon particles having an oxygen content of 0.15% by mass or less, the content of the carbon particles having an oxygen content of 0.15% by mass or less with respect to the total negative electrode material is preferably 50% by mass or more, more preferably 70% by mass or more, further preferably 80% by mass or more.

When the negative electrode material includes the carbon particles having an oxygen content of 0.15% by mass or less and a negative electrode material other than the carbon particles having an oxygen content of 0.15% by mass or less, the oxygen content of the total negative electrode material is preferably 0.15% by mass or less.

<Method for Manufacturing Negative Electrode Material for Lithium-Ion Secondary Cell>

The method for manufacturing a negative electrode material for a lithium-ion secondary cell according to the present disclosure includes a process of heating carbon particles until a temperature of the carbon particles is from 400° C. to 1300° C. and a process of cooling the carbon particles after the heating until a temperature of the carbon particles is less than 400° C., and the heating and the cooling are performed in a non-oxidizing atmosphere, respectively.

According to the method as specified above, carbon particles having an oxygen content of 0.15% by mass or less (negative electrode material) can be produced. The reason for this is as follows.

The oxygen-containing functional groups included in the carbon particles start to decompose at a temperature of 400° C. or more, decompose to a greater degree at a temperature of 600° C. or more, and the major oxygen-containing functional groups decompose at a temperature of 750° C. or more. On the other hand, when the temperature of the carbon particles is greater than 1300° C., graphite crystals are developed and lattice defects are decreased. As a result, the amount of rhombohedral crystals is decreased, whereby the input/output properties may be lowered. Accordingly, by heating the carbon particles at a temperature of from 400° C. to 1300° C., it is possible to reduce or remove the oxygen-containing functional groups to 0.15% by mass or less without lowering the input/output properties.

Meanwhile, oxidation of the carbon particles tends to proceed at a temperature of 400° C. or more. Therefore, by performing the cooling of the carbon particles after the heating until the temperature is less than 400° C. in a non-oxidizing atmosphere, it is possible to suppress the recovery in the oxygen content of the carbon particles caused by the oxidation of the carbon particles.

In the method, the time for heating the carbon particles to a temperature of from 400° C. to 1300° C. is not particularly limited. For example, the heating may be performed such that the temperature of the carbon particles is maintained at a temperature of from 400° C. to 1300° C. for 30 minutes to 2 hours.

In the method, the cooling of the carbon particles may be performed until the temperature of the carbon particles is 200° C. or less in a non-oxidizing atmosphere, or may be performed until the temperature of the carbon particles is room temperature (25° C.) or less in a non-oxidizing atmosphere.

The non-oxidizing atmosphere used in the method is not particularly limited, and may be a reducing atmosphere or an inert atmosphere of hydrogen, helium, argon, nitrogen or the like, or may be a vacuum atmosphere. The non-oxidizing atmosphere preferably does not include oxygen, but may include oxygen to such an extent that the oxidation of the carbon particles does not proceed. For example, the non-oxidizing atmosphere may include oxygen in an amount of 0.3% by volume or less, preferably 0.1% by volume or less, more preferably 0.15% by volume or less. The higher the temperature for the treatment is, the lower the oxygen content is desired to be.

The method for the heating and the cooling of the carbon particles is not particularly limited, and may be conducted using a common device such as an electric furnace.

The details and preferred embodiments of the carbon particles used in the method are the same as the details and preferred embodiments of the carbon particles as described above.

<Negative Electrode Material Slurry for Lithium-Ion Secondary Cell>

The negative electrode material slurry for a lithium-ion secondary cell according to the present disclosure (hereinafter, also referred to as a negative electrode material slurry), includes the negative electrode material as described above, an organic binder, and a solvent.

The organic binder is not particularly limited, and examples thereof include styrene-butadiene rubber, a polymer compound formed from an ethylenic unsaturated carboxylic acid ester such as methyl (meth)acrylate, ethyl (meth)acrylate, butyl (meth)acrylate or hydroxyethyl (meth) acrylate as a polymerizable compound, a polymer compound formed from an ethylenic unsaturated carboxylic acid such as acrylic acid, methacrylic acid, itaconic acid, fumaric acid or maleic acid as a polymerizable compound, polyvinylidene fluoride, polyethylene oxide, polyepichlorohydrin, polyphosphazene, polyacrylonitrile, polyimide and polyamide-imide. In the present disclosure, the "(meth)acrylate" refers to either one or both of methacrylate and acrylate.

The solvent is not particularly limited, and examples thereof include water, an organic solvent or a mixture thereof. Examples of the organic solvent include N-methylpyrrolidone, dimethylacetamide, dimethylformamide and γ-butyrolactone.

The negative electrode material slurry may include a thickening agent for adjusting the viscosity, as necessary. Examples of the thickening agent include carboxymethylcellulose, methylcellulose, hydroxymethylcellulose, ethylcellulose, polyvinylalcohol, polyacrylic acid and a salt thereof, oxidized starch, phosphorylated starch and casein.

The negative electrode material slurry may include a conductive aid, as necessary. Examples of the conductive aid include carbon black, graphite, graphene, acetylene black, carbon nanotube and a nitride having electroconductivity.

The content of the negative electrode material included in the negative electrode material slurry is not particularly limited. For example, the content of the negative electrode material may be from 90% by mass to 99% by mass of the non-volatile components (components other than a solvent) of the negative electrode material slurry.

<Negative Electrode for Lithium-Ion Secondary Cell>

The negative electrode for a lithium-ion secondary cell (hereinafter, also referred to as a negative electrode) has a current collector and a negative electrode layer formed on the current collector, and the negative electrode layer includes the negative electrode material as described above.

The material and the shape of the current collector are not particularly limited. For example, a ribbon-shaped foil, a ribbon-shaped punched foil or a ribbon-shaped mesh made of a metal or an alloy such aluminum, copper, nickel, titanium or stainless steel may be used as a current collector. It is also possible to use a porous material such as a porous metal (foamed metal) or a carbon paper.

The method for forming a negative electrode material layer including a negative electrode material is not particularly limited. For example, the negative electrode material layer may be formed by a known method such as metal mask printing, electrostatic coating, dip coating, spray coating, roll coating, doctor blade coating, gravure coating or screen printing. When the negative electrode material layer is integrated with a current collector, the integration may be performed with a known device such as a roller, a presser, or a combination of thereof.

The negative electrode obtained by forming a negative electrode layer on a current collector may be subjected to a thermal treatment. By performing a thermal treatment, a solvent in the negative electrode material layer is removed and the strength of the negative electrode layer is increased by the curing of a binder. As a result, the adhesion between the particles, and the adhesion between the negative electrode material layer and the current collector, are improved. In order to prevent the oxidation of the current collector, the thermal treatment may be performed in an inert atmosphere such as helium, argon or nitrogen or in a vacuum atmosphere.

The electrode density of the negative electrode is not particularly limited. For example, the electrode density of the negative electrode can be adjusted by pressing the negative electrode material layer in a state of being formed on the current collector.

The electrode density of the negative electrode may be, for example, from 1.5 g/cm$^3$ to 1.9 g/cm$^3$, or may be from 1.6 g/cm$^3$ to 1.8 g/cm$^3$. The higher the electrode density is, the more the volumetric capacitance tends to improve, and the more the adhesion of the negative electrode material layer to the current collector tends to improve. When the lithium-ion secondary cell is used for a purpose in which the current density is more important than the volumetric capacitance (such as HEVs), the electrode density may be 1.5 g/cm$^3$ or less.

<Lithium-Ion Secondary Cell>

The lithium-ion secondary cell according to the present disclosure has a positive electrode, an electrolyte, and the negative electrode for a lithium-ion secondary cell as described above.

The lithium-ion secondary cell may have a member other than those as mentioned above, as necessary. For example, the lithium-ion secondary cell may at least have a configuration in which a negative electrode and a positive electrode are disposed to face each other via a separator, and an electrolyte solution including an electrolyte is injected.

The positive electrode may be obtained by forming a positive electrode layer on a current collector, like the negative electrode. The material for the current collector may be, for example, a ribbon-shaped foil, a ribbon-shaped punched foil or a ribbon-shaped mesh made of a metal or an alloy such as aluminum, titanium or stainless steel.

The positive electrode material for the positive electrode layer is not particularly limited, and examples thereof include a metal compound, a metal oxide, a metal sulfide and an electroconductive polymer material, which are capable of doping or intercalating the lithium ions. Further, it is possible to use lithium cobalt oxide ($LiCoO_2$), lithium nickel oxide ($LiNiO_2$), lithium manganese oxide ($LiMnO_2$), multiple oxide thereof ($LiCo_xNi_yMn_zO_2$, x+y+z=1, 0<x, 0<y; $LiNi_{2-x}Mn_xO_4$, 0<x≤2), spinel-type lithium manganese oxide ($LiMn_2O_4$), lithium-vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni,Mn,Fe), an electroconductive polymer such as polyacetylene, polyaniline, polypyrrol, polythiophene and polyacene, and porous carbon. These materials may be used alone or in combination of two or more. For the purpose of increasing the capacity, nickel-cobalt-aluminum (NCA) is also suitably used as the positive electrode material.

Examples of the separator include a nonwoven cloth, a cloth, a microporous film or a combination thereof, being made of polyolefin such as polyethylene or polypropylene. When the lithium-ion secondary cell has a configuration in which the positive electrode and the negative electrode do not contact each other, it is not necessary to use a separator.

As the electrolyte solution, an organic electrolyte solution obtained by dissolving a lithium salt such as $LiClO_4$, $LiPF_6$, $LiAsF_6$, $LiBF_4$ or $LiSO_3CF_3$ in a non-aqueous solvent may be used. The non-aqueous solvent may be ethylene carbonate, propylene carbonate, butylene carbonate, vinylene carbonate, fluoroethylene carbonate, cyclopentanone, sulfolane, 3-methyl sulfolane, 2,4-dimethyl sulfolane, 3-methyl-1,3-oxasolidine-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyl tetrahydrofuran, 1,3-dioxolane, methyl acetate, ethyl acetate, and a mixture of two or more thereof. In particular, an electrolyte solution including fluoroethylene carbonate is suitable because it tends to form a stable solid electrolyte interface (SEI) on a surface of a negative electrode material, thereby significantly improving the cycle properties.

The configuration of the lithium-ion secondary cell is not particularly limited, and examples thereof include a paper-shaped cell, a button-shaped cell, a coin-shaped cell, a laminated cell, a cylindrical cell, and a rectangular cell. The negative electrode material for a lithium-ion secondary cell can be applied to any kind of electrochemical device having a charge/discharge system that employs the intercalation and desorption of lithium ions, such as a hybrid capacitor.

The lithium-ion secondary cell according to the present disclosure exhibits excellent storage properties (especially high-temperature storage properties). Therefore, the lithium-ion secondary cell according to the present disclosure is especially suitable for a purpose in which the use under a high-temperature environment is envisaged, such as electric vehicles and electric storage systems.

EXAMPLES

In the following, the embodiments as described above are explained more specifically by referring to the Examples. However, the embodiments are not limited to the Examples.

(1) Preparation of Negative Electrode Materials

Negative electrode materials of the Examples were prepared by heating the carbon particles as a raw material as mentioned below to a heating temperature shown in Table 1 (maximum temperature), maintaining the carbon particles at the heating temperature for 30 minutes, and cooling the carbon particles to room temperature (25° C.). The heating and the cooling were performed in a consecutive manner using an electronic furnace in a nitrogen atmosphere (oxygen concentration: 0.005-0.2% by volume).

Carbon particles 1: spherical natural graphite particles, volume average particle size: 9.9 μm, circularity: 0.95

Carbon particles 2: spherical natural graphite particles, volume average particle size: 12.2 μm, circularity: 0.92

Carbon particles 3: spherical natural graphite particles, volume average particle size: 15.8 μm, circularity: 0.85

Carbon particles 4: spherical natural graphite particles, volume average particle size: 18.1 μm, circularity: 0.88

Carbon particles 5: spherical natural graphite particles, volume average particle size: 21.6 μm, circularity: 0.90

As the negative electrode materials for Comparative Examples 1-5, the carbon particles as a raw material were used (without performing a thermal treatment).

As the negative electrode materials for Comparative Example 6, carbon particles 6, coated with amorphous carbon (3% by mass), were used.

Carbon particles 6 were prepared by mixing 100 parts by mass of carbon particles 1 with 6 parts by mass of coal tar pitch (softening point: 90° C., carbonization rate: 50%), and subjecting the mixture to a process of increasing the temperature up to 1000° C. at a rate of 20° C./min and maintaining the temperature at 1000° C. (sintering temperature) for 1 hour under a nitrogen flow.

(Measurement of Specific Surface Area, Oil Absorption Amount, Tap Density, Volume Average Particle Size, R Value and Rhombohedral Crystal Amount)

The specific surface area, oil absorption amount, tap density, volume average particle size, R value and rhombohedral crystal amount were measured by the methods as described above, respectively. The results are shown in Table 1.

(DTA)

Whether or not the negative electrode materials have a peak in a range of from 500° C. to 650° C. was determined by DTA.

As a result, a peak was observed in a range of from 500° C. to 650° C. in carbon particles 6 coated with amorphous carbon (Comparative Example 6), whereas a peak was not observed in a range of from 500° C. to 650° C. in the Examples and the Comparative Examples in which carbon particles 1 to 5 were used.

(Pressing Property)

The negative electrode material (3.0 g) was charged in a cylindrical mold with a diameter of 15 mm, and was compressed at a constant rate of 10 mm/min with an autograph (Shimadzu Corporation). During the compression, a distance between the bottom surface of the negative electrode material and the press surface was measured, and the density of the negative electrode material during the compression was calculated from the distance, the area of the base of the mold (1.767 cm$^2$) and the volume of the negative electrode material. A load cell was attached to the press hammer of the autograph, and the pressing force (kN/cm$^2$) at which the volume of the negative electrode material was 1.7 g/cm$^3$ was measured.

(Measurement of Oxygen Content)

The oxygen content of the negative electrode material (% by mass) was measured by an infrared absorption method under the following conditions. The measurement was performed using TCH-600, LECO Japan). The results are shown in Table 1.

—Parameters for Analysis—
Outgas cycle: 2 cycles
Analysis delay: 30 seconds
Analysis delay comparator: 1.0%
Type of analysis: automatic analysis
—Parameters for Furnace—
Furnace control mode: power (W)
Purge time: 15 seconds
Outgas time: 30 seconds
Outgas cool time: 5 seconds
Outgas low (start) power: 5400 W
Outgas high (end) power: 5400 W
Analysis low (start) power: 5000 W
Analysis high (end) power: 5000 W
Analysis temperature increase rate: 0° C./second
—Element Parameters—
Element: oxygen
Minimum integration time: 55 seconds
Integration delay: 10 seconds
Comparator level: 0.50%
—Other Conditions—
Crucible: graphite crucible for high temperature
Mass of specimen: approximately 1.0 g (2) Evaluation of Cell Properties and Electrode Plate Properties A slurry was prepared by adding water to 98 parts by mass of the negative electrode material, 1 part by mass of styrene butadiene rubber (BM-400B, Zeon Corporation) and 1 part by mass of carboxymethylcellulose (CMC2200, Daicel Corporation).

The slurry was applied onto a current collector (a copper foil of 10 μm in thickness) to form a negative electrode material layer, and the negative electrode material layer was dried at 110° C. for 1 hour in the air. The negative electrode material layer was formed such that the amount of the slurry per area was 10.0 mg/cm'. Subsequently, the applied layer (negative electrode material layer) was integrated with the current collector by roll pressing to have a predetermined electrode density (1.70 g/cm$^3$), thereby obtaining a negative electrode.

A 2016-type coin cell for the evaluation was prepared using the negative electrode prepared in the above process, metallic lithium as a positive electrode, a mixture of ethylene carbonate/ethyl methyl carbonate (3/7 by volume) and vinylene carbonate (0.5% by mass) including 1.0 M of LiPF$_6$ as an electrolyte solution, a polyethylene microporous film with a thickness of 25 μm as a separator, and a copper plate with a thickness of 230 μm as a spacer. The cell properties and the electrode plate properties (electrode expansion rate) were evaluated using the cell for the evaluation. The results are shown in Table 2.

(Irreversible Capacity)

The lithium-ion secondary cell was placed in a thermostatic chamber at 25° C., and was charged at a constant current of 0.1 C until the voltage was 0 V (V vs. Li/Li$^+$). Subsequently, the lithium-ion secondary cell was charged at a constant voltage of 0 V until the current was 0.02 C, and the capacity at this time was regarded as the initial charge capacity.

After an interval of 30 minutes, the lithium-ion secondary cell was discharged at a constant current of 0.1 C until the voltage was 1.5 V (V vs. Li/Li⁺). The capacity at this time was regarded as the initial discharge capacity.

The irreversible capacity was calculated by subtracting the initial discharge capacity from the initial charge capacity, and was used as an index for the initial charge/discharge properties.

The "C" used as the unit of a current refers to a value of "current (A)/capacity of cell (Ah)".

(Electrode Expansion Rate)

The proportion of the thickness of the negative electrode material layer in a fully charged state with respect to the thickness of the negative electrode material layer before performing the initial charge, with an electrode density of 1.7 g/cm³, was regarded as the charge expansion rate.

The proportion of the thickness of the negative electrode material layer after the discharge with respect to the thickness of the negative electrode material layer before performing the initial charge, with an electrode density of 1.7 g/cm³, was regarded as the discharge expansion rate.

(Initial Efficiency)

The proportion of the value of the initial discharge capacity with respect to the initial charge capacity, which were initially measured, was regarded as the initial efficiency.

(Discharge Load Properties)

The proportion of the discharge capacity when the cell was discharged at a current of 2.0 C at the third cycle, with respect to the discharge capacity when the cell was discharged at a current of 0.2 C at the second cycle (rate (2.0 C/0.2 C) was regarded as an index for the discharge load properties. Other conditions (such as the charge current, cut voltage, interval time) were the same as the conditions for the initial charge and discharge.

(Maintenance Ratio after Storage)

The cell for the evaluation after the measurement of the initial efficiency was placed in a thermostatic chamber at 25° C., and was charged at a constant current of 0.2 C until the voltage was 0 V (V vs. Li/Li⁺). Subsequently, the lithium-ion secondary cell was charged at a constant voltage of 0 V until the current was 0.02 C. After an interval of 30 minutes, the cell was discharged at a constant current of 0.2 C until the voltage was 1.5 V (V vs. Li/Li⁺). The discharge capacity at this time (discharge capacity at second cycle at 25° C.) was measured.

Subsequently, the cell was charged at a constant current of 0.2 C until the voltage was 0 V (V vs. Li/Li⁺), and was charged at a constant voltage of 0 V until the current was 0.02 C, and the cell was placed in a thermostatic chamber at 60° C. for 5 days.

Subsequently, the cell was placed in a thermostatic chamber at 25° C. for 60 minutes, and was discharged at a constant current of 0.2 C until the voltage was 1.5 V (V vs. Li/Li⁺). The discharge capacity at this time (discharge capacity at first cycle at 25° C. after storage at 60° C. for 5 days) was measured. The maintenance ratio after storage was calculated by the following formula.

Maintenance ratio after storage (%)=(discharge capacity at first cycle at 25° C. after storage at 60° C. for 5 days)/(discharge capacity at second cycle at 25° C.)×100

(DCR after Storage (25° C.))

The cell for the evaluation was placed in a thermostatic chamber at 25° C., and was charged and discharged for one cycle under the conditions of charge: CC/CV 0.2 C 0 V 0.02 C cut, discharge: CC 0.2 C 1.5 V Cut. Subsequently, the cell was charged at a constant current of 0.2 C until the SOC was 50%.

Thereafter, the cell for the evaluation was placed in a thermostatic chamber at 25° C., and was charged at a constant current of 1 C, 3 C and 5 C for 10 seconds, respectively. The voltage drop (ΔV) at each of the constant currents was measured, and the direct current resistance (DCR) was calculated and regarded as the DCR after storage at 25° C.

$$DCR[\Omega]=\{(3\ C\ \text{voltage drop}\ \Delta V\text{--}1\ C\ \text{voltage drop}\ \Delta V)+(5\ C\ \text{voltage drop}\ \Delta V\text{--}3\ C\ \text{voltage drop}\ \Delta V)\}/4$$

(DCR after Storage (−30° C.))

The cell for the evaluation was placed in a thermostatic chamber at 25° C., and was charged and discharged for one cycle under the conditions of charge: CC/CV 0.2 C 0 V 0.02 C cut, discharge: CC 0.2 C 1.5 V Cut. Subsequently, the cell was charged at a constant current of 0.2 C until the SOC was 50%.

Thereafter, the cell for the evaluation was placed in a thermostatic chamber at −30° C., and was charged at a constant current of 0.1 C, 0.3 C and 0.5 C for 10 seconds, respectively. The voltage drop (ΔV) at each of the constant currents was measured, and the direct current resistance (DCR) was calculated and regarded as the DCR after storage at −30° C.

$$DCR[\Omega]=\{(0.3\ C\ \text{voltage drop}\ \Delta V\text{--}0.1\ C\ \text{voltage drop}\ \Delta V)+(0.5\ C\ \text{voltage drop}\ \Delta V\text{--}0.3\ C\ \text{voltage drop}\ \Delta V)\}/0.4$$

TABLE 1

| | Raw material | Heating temperature ° C. | Specific surface area m²/g | rhombohedral crystal amount — | Oil absorption amount mL/100 g | Tap density (30 times) g/cc | Tap density (250 times) g/cc | D50 μm | R value — | Oxygen content % by mass | Pressing property kN/cm² |
|---|---|---|---|---|---|---|---|---|---|---|---|
| Comparative Example 1 | Graphite particles 1 | — | 10.8 | 0.28 | 47.8 | 0.79 | 0.99 | 9.9 | 0.40 | 0.27 | 2.7 |
| Comparative Example 2 | Graphite particles 2 | — | 8.7 | 0.27 | 50.1 | 0.78 | 0.97 | 12.2 | 0.33 | 0.25 | 2.3 |
| Comparative Example 3 | Graphite particles 3 | — | 6.6 | 0.26 | 53.0 | 0.73 | 0.98 | 15.8 | 0.30 | 0.24 | 2.0 |
| Comparative Example 4 | Graphite particles 4 | — | 6.0 | 0.25 | 46.6 | 0.76 | 0.97 | 18.1 | 0.27 | 0.24 | 1.6 |
| Comparative Example 5 | Graphite particles 5 | — | 5.2 | 0.24 | 45.8 | 0.80 | 1.02 | 21.6 | 0.26 | 0.22 | 1.2 |
| Comparative Example 6 | Graphite particles 6 | — | 3.7 | 0.29 | 44.5 | 0.84 | 1.09 | 10.0 | 0.46 | 0.21 | 3.2 |
| Example 1 | Graphite particles 1 | 600 | 10.8 | 0.28 | 45.1 | 0.86 | 1.08 | 10.0 | 0.41 | 0.15 | 2.4 |

TABLE 1-continued

|  | Raw material | Heating temperature ° C. | Specific surface area m²/g | rhombohedral crystal amount — | Oil absorption amount mL/100 g | Tap density (30 times) g/cc | Tap density (250 times) g/cc | D50 μm | R value — | Oxygen content % by mass | Pressing property kN/cm² |
|---|---|---|---|---|---|---|---|---|---|---|---|
| Example 2 | Graphite particles 1 | 800 | 11.3 | 0.28 | 44.9 | 0.85 | 1.08 | 9.9 | 0.38 | 0.05 | 2.4 |
| Example 3 | Graphite particles 1 | 1000 | 11.2 | 0.27 | 44.3 | 0.86 | 1.06 | 9.9 | 0.41 | 0.03 | 2.4 |
| Example 4 | Graphite particles 1 | 1200 | 10.8 | 0.24 | 44.1 | 0.86 | 1.06 | 9.9 | 0.26 | 0.02 | 2.4 |
| Example 5 | Graphite particles 2 | 1000 | 8.5 | 0.25 | 46.8 | 0.84 | 1.04 | 12.7 | 0.36 | 0.02 | 1.8 |
| Example 6 | Graphite particles 3 | 1000 | 6.8 | 0.23 | 49.8 | 0.87 | 1.03 | 15.7 | 0.28 | 0.01 | 1.4 |
| Example 7 | Graphite particles 4 | 1000 | 6.0 | 0.21 | 46.6 | 0.82 | 1.02 | 18.2 | 0.25 | 0.01 | 1.2 |
| Example 8 | Graphite particles 5 | 1000 | 5.4 | 0.21 | 42.8 | 0.85 | 1.08 | 22.2 | 0.21 | 0.01 | 1.0 |

TABLE 2

|  | Charge expansion rate % | Discharge expansion rate % | Irreversible capacity per area mAh/m² | Irreversible capacity mAh/g | Initial efficiency % | Rate (2.0 C/0.2 C) % | Maintenance rate after storage % | DCR after storage (25° C.) Ω | DCR after storage (−30° C.) Ω |
|---|---|---|---|---|---|---|---|---|---|
| Comparative Example 1 | 133 | 115 | 4.5 | 49 | 88.1 | 98.4 | 87.7 | 14.0 | 219 |
| Comparative Example 2 | 127 | 113 | 4.3 | 37 | 90.6 | 98.1 | 88.4 | 11.9 | 218 |
| Comparative Example 3 | 127 | 112 | 4.7 | 31 | 92.0 | 98.0 | 89.2 | 9.8 | 211 |
| Comparative Example 4 | 125 | 112 | 5.1 | 30 | 92.3 | 97.7 | 89.7 | 11.2 | 208 |
| Comparative Example 5 | 123 | 111 | 5.5 | 29 | 92.6 | 97.1 | 90.1 | 12.4 | 217 |
| Comparative Example 6 | 140 | 118 | 8.4 | 31 | 91.9 | 99.0 | 87.4 | 9.9 | 184 |
| Example 1 | 123 | 109 | 3.5 | 37 | 89.7 | 99.0 | 90.6 | 11.6 | 201 |
| Example 2 | 123 | 109 | 3.7 | 41 | 89.8 | 99.4 | 90.7 | 11.3 | 194 |
| Example 3 | 122 | 108 | 3.6 | 41 | 90.0 | 99.3 | 90.8 | 11.3 | 190 |
| Example 4 | 123 | 108 | 3.7 | 40 | 90.2 | 99.0 | 91.0 | 13.0 | 205 |
| Example 5 | 124 | 110 | 3.2 | 27 | 93.1 | 99.3 | 91.8 | 10.2 | 203 |
| Example 6 | 124 | 109 | 3.8 | 26 | 93.2 | 99.4 | 92.3 | 9.6 | 182 |
| Example 7 | 123 | 110 | 3.6 | 21 | 94.4 | 99.1 | 91.8 | 10.5 | 199 |
| Example 8 | 123 | 109 | 4.0 | 22 | 94.4 | 98.0 | 92.4 | 11.3 | 197 |

The "irreversible capacity per area" in Table 2 refers to a value obtained by dividing the irreversible capacity by the specific surface area.

As shown in Tables 1 and 2, the negative electrode materials of Examples 1 to 8 and Comparative Examples 1 to 5, which are not coated with an amorphous carbon, exhibit a smaller electrode expansion rate, as compared with the negative electrode material of Comparative Example 6, which are coated with an amorphous carbon. Accordingly, it is considered that the expansion of the electrode can be suppressed by not coating the carbon particles with an amorphous carbon.

In addition, the negative electrode material of Example 5 is pressed with a smaller pressing force than the negative electrode material of Comparative Example 2, in which the same carbon particles as Example 5 are used, and the expansion of the electrode in Example 5 is more suppressed than Comparative Example 2. The expansion of the electrode suggests that a torsion energy stored by the pressing is relieved; that the electrode is separated from a current collector due to insufficient adhesion; and that the precipitation of Li is developed at a surface of active materials. Therefore, an electrode having a suppressed expansion rate tends to exhibit excellent charge/discharge properties.

The negative electrode materials of the Examples, having an oxygen content of 0.15% by mass or less, tend to have a smaller irreversible capacity as compared with the negative electrode materials of the Comparative Examples obtained from the same carbon particles but having an oxygen content of greater than 0.15% by mass (for example, Example 1 to 4 using carbon particles 1 as compared with Comparative Example 1 using carbon particles 1). The results suggest that the reaction activity of the negative electrode material with respect to an electrolyte solution is suppressed when the oxygen content of the carbon particles is 0.15% by mass or less.

The negative electrode material of the Examples tend to have a higher initial efficiency as compared with the negative electrode materials of the Comparative Examples obtained from the same carbon particles. The results suggest that the charge/discharge properties of a cell is improved when the oxygen content of the carbon particles is 0.15% by mass or less. In addition, the negative electrode material of the Examples tend to have a smaller resistivity in the DCR after a storage at high temperature as compared with the negative electrode materials of the Comparative Examples obtained from the same carbon particles. The results suggest that the decomposition of an electrolyte solution or the growth of an SEI film can be suppressed even when the cell is subjected to the high temperature conditions for a long period of time.

The negative electrode material of the Examples tend to have a higher maintenance ratio after a storage at high temperature as compared with the negative electrode materials of the Comparative Examples obtained from the same carbon particles, and exhibit a better balance with the input/output properties. The results suggest that the durability under high temperatures of a cell can be improved while maintaining the input/output properties of the cell, which are generally contradicting each other, when the oxygen content of the carbon particles is 0.15% by mass or less.

The invention claimed is:

1. A negative electrode material for a lithium-ion secondary cell, comprising natural graphite particles having an oxygen content of 0.04% by mass or less.

2. The negative electrode material for a lithium-ion secondary cell according to claim 1, wherein the natural graphite particles have an R value of 0.45 or less.

3. The negative electrode material for a lithium-ion secondary cell according to claim 1, wherein the natural graphite particles have a rhombohedral crystal amount of greater than 0.20.

4. The negative electrode material for a lithium-ion secondary cell according to claim 1, wherein the natural graphite particles have a circularity of greater than 0.8.

5. The negative electrode material for a lithium-ion secondary cell according to claim 1, wherein the natural graphite particles do not have a DTA exothermic peak detected in a range of from 500° C. to 650° C. in differential thermal analysis.

6. The negative electrode material for a lithium-ion secondary cell according to claim 1, wherein the natural graphite particles have a specific surface area measured by nitrogen gas adsorption of 4.0 m²/g or more.

7. A negative electrode material slurry for a lithium-ion secondary cell, comprising the negative electrode material for a lithium-ion secondary cell according to claim 1, an organic binder, and a solvent.

8. A negative electrode for a lithium-ion secondary cell, comprising a current collector and a negative electrode layer, the negative electrode layer comprising the negative electrode material for a lithium-ion secondary cell according to claim 1.

9. A lithium-ion secondary cell, comprising a positive electrode, an electrolyte, and the negative electrode for a lithium-ion secondary cell according to claim 8.

10. A method for manufacturing a negative electrode material for a lithium-ion secondary cell, the method comprising:
a process of heating natural graphite particles until a temperature of the natural graphite particles is from 1000° C. to 1300° ° C.; and
a process of cooling the natural graphite particles after the heating until a temperature of the natural graphite particles is less than 400° C.,
the heating and the cooling being performed in a non-oxidizing atmosphere, respectively.

11. The method for manufacturing a negative electrode material for a lithium-ion secondary cell according to claim 10, which is a method for manufacturing the negative electrode material for a lithium-ion secondary cell according to claim 1.

* * * * *